United States Patent [19]

Miffitt

[11] Patent Number: 4,571,828
[45] Date of Patent: Feb. 25, 1986

[54] LUBRICATED GLASS CUTTER

[75] Inventor: Roger G. Miffitt, West Hartford, Conn.

[73] Assignee: Fletcher-Terry Company, Farmington, Conn.

[21] Appl. No.: 590,866

[22] Filed: Mar. 19, 1984

[51] Int. Cl.⁴ ............................................. B65B 3/00
[52] U.S. Cl. .............................. 30/123.3; 30/164.95; 403/116; 403/378
[58] Field of Search ............ 30/164.95, 164.9, 123.3, 30/84, 320, 321, 330, 331, 340; 184/16, 64, 102, 82, 83, 65, 75; 222/544, 187, 422; 403/112, 116, 117, 378, 379, 349

[56] References Cited

U.S. PATENT DOCUMENTS

| | | | |
|---|---|---|---|
| 778,023 | 12/1904 | Fells | 30/164.95 |
| 925,794 | 6/1909 | Aune | 222/318 |
| 947,991 | 2/1910 | Hurt | 222/314 |
| 989,603 | 4/1911 | Hornig | 30/123.3 |
| 1,606,802 | 11/1926 | Hurtz et al. | 30/123.3 |
| 2,042,965 | 6/1936 | Rivard | 30/123.3 |
| 2,141,565 | 12/1938 | Stilson | 30/321 |
| 2,316,679 | 4/1943 | Evans | 403/104 |
| 2,624,902 | 1/1953 | Soldner | 15/139 |
| 2,810,960 | 10/1957 | Johnson et al. | 30/164.9 UX |
| 2,939,613 | 6/1960 | Herman et al. | 222/181 |
| 3,136,191 | 6/1964 | Madge | 83/12 |
| 4,110,907 | 9/1978 | Einhorn et al. | 30/164.95 |
| 4,287,669 | 9/1981 | Arai | 30/123.3 |
| 4,451,981 | 6/1984 | Kaniarz | 30/164.95 |

FOREIGN PATENT DOCUMENTS

| | | |
|---|---|---|
| 566170 | 7/1960 | Belgium . |
| 1940442 | 2/1971 | Fed. Rep. of Germany . |
| 403488 | 12/1933 | United Kingdom .................. 184/65 |

OTHER PUBLICATIONS

Fletcher-Terry Company; Sketch showing the type of glass cutters, having self-contained oil reservoirs, that have been offered commercially, Sketch dated 8/4/83.

*Primary Examiner*—Douglas D. Watts

[57] ABSTRACT

Force upon the cutting head of a glass cutter will displace it rearwardly into the handle, thereby opening a valve by shifting an interconnecting tubular stem, admitting air into the reservoir. The air passes through the stem, the lubricant flows along its exterior, and both pass through a wick disposed to apply the lubricating fluid to the cutting wheel.

17 Claims, 7 Drawing Figures

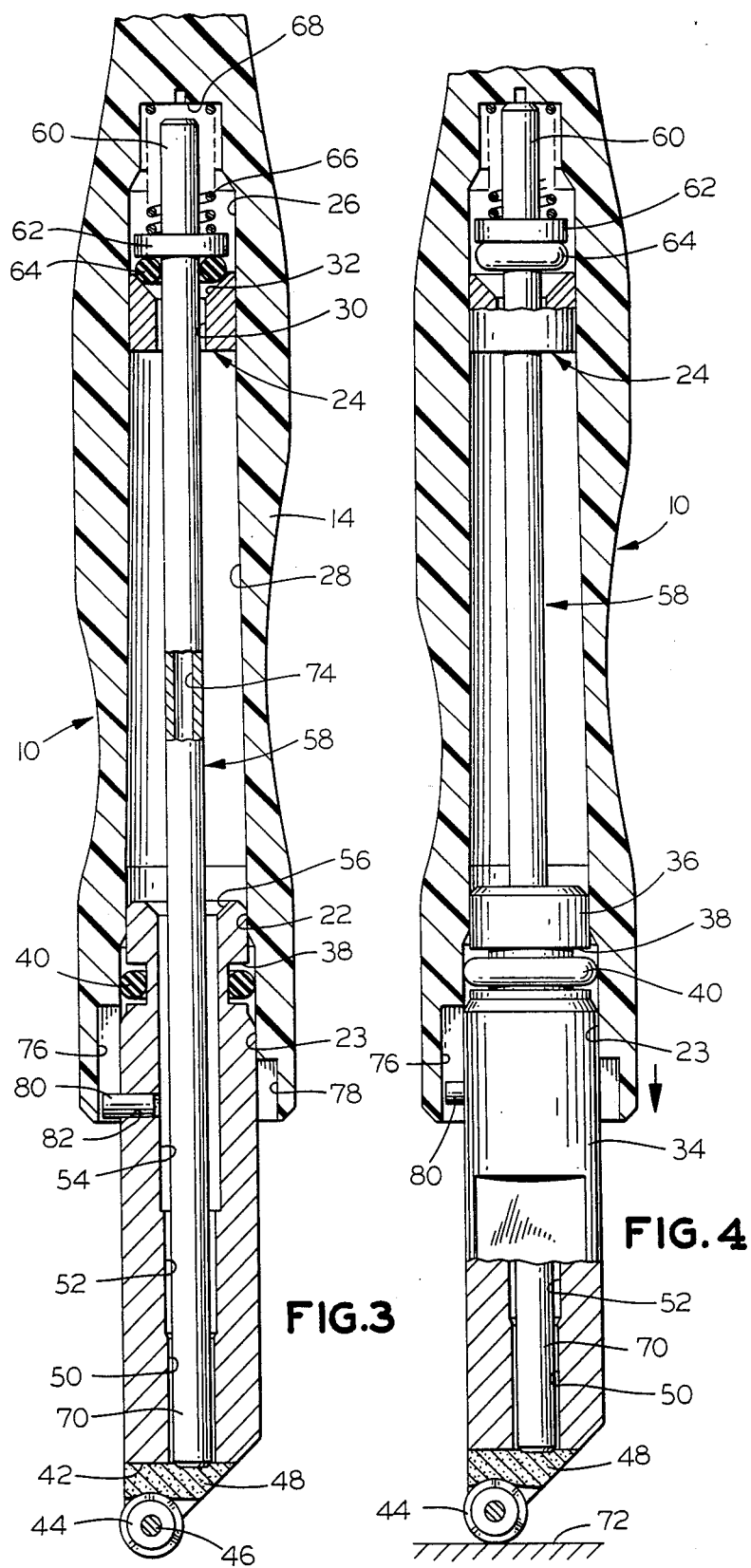
FIG. 3
FIG. 4
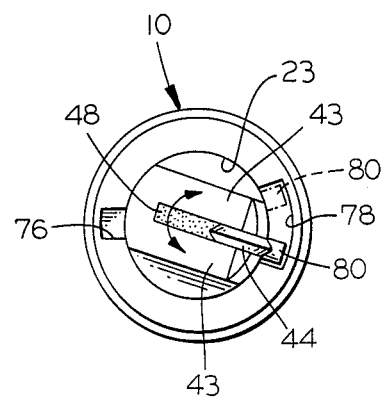
FIG. 7
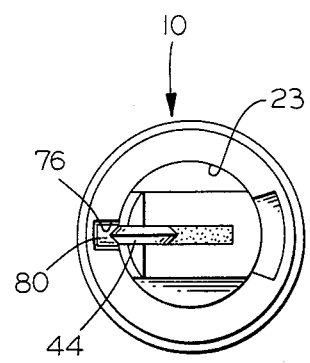
FIG. 6

LUBRICATED GLASS CUTTER

BACKGROUND OF THE INVENTION

The performance of cutting tools can often be improved by lubricating the work or the cutting element. In regard to glass, for example, lubricaton produces smoother and more precise operation, and helps to prevent flaking along the score line; it is particularly advantageous for cutting stained glass elements. In mechanical systems, lubrication may also serve a cooling function, thereby avoiding overheating and maximizing the useful life of the tool.

The desirability of providing a reservoir of a liquid lubricating substance for such a cutting device has long been recognized. In Fells U.S. Pat. No. 778,023, for example, a manual glass cutter is disclosed which consists of a hollow body connected to a head on which the cutting wheel is mounted. The head has a bore providing communication between the cutting wheel and the oil reservoir provided by the hollow body, and a wad of cotton or the like may be used to filter the lubricant. In one emoodiment, the bore of the head member is closed by a valve which is operated by a threaded knob at the end of the handle. In a second case, the handle has a small port located under a threaded cap; displacement of the cap will permit air to pass through tne port, and will thereby allow the oil to flow into the bore.

A device somewhat similar to that of the Fells Patent is disclosed by Rivard in U.S. Pat. No. 2,042,965. He utilizes, however, a stop-cock to control the admission of air and escape of fluid through a passageway to the cutting element, and applies his concepts to roofers knives as well as to rotary cutting instruments. Another similar device is shown in Belgian Pat. No. 566170, and Kurtz et al disclose, in U.S. Pat. No. 1,606,802, a glass cutter having a separate lubricator mounted upon the holder, with a wick to apply the lubricating fluid to the work.

The advantages of providing, in such so-called "oil cutters", means for automatically releasing controlled amounts of lubricant during normal cutting operations have also been recognized. One early device of this nature, disclosed by Hornig in U.S. Pat. No. 989,603, has a separate reservoir from which the lubricant is dispensed, through contact of a shank upon the work, as the cutter is moved along it. In addition, glass cutters having a pressure-responsive oil feed feature as well as a self-contained reservoir are shown in U.S. Pat. Nos. 4,110,907 and 4,287,699, to Einhorn et al and Arai, respectively, and in German Offenlegungsscrift No. 1,940,442. Madge U.S. Pat. No. 3,136,191 discloses a head for a glass cutting machine providing such a lubricating feature.

The prior art also discloses other types of devices for dispensing a variety of liquid substances, in response to manual force. Aune shows a fountain oiler in U.S. Pat. No. 925,794; Hurt shows an oil can in U.S. Pat. No. 947,991; a fountain marking device is disclosed by Soldner in U.S. Pat. No. 2,624,902; and a soap dispenser is disclosed by Herman et al in U.S. Pat. No. 2,939,613.

Glass cutters having a self-contained oil supply have also been offered commercially in the past. One such device consists of a hollow body for containing the lubricant, and a cutting head attached to the body by a rod. The rod simultaneously operates a pair of valves, when the head is depressed against the workpiece; one valve permits the flow of oil from the reservoir, and the other controls the admission of air.

Despite the foregoing, a need remains for a simple, pressure-responsive cutting device having a self-contained supply of lubricant, which consists of a minimum number of parts and is nevertheless highly convenient and efficient in use.

Accordingly, it is an object of the present invention to provide a novel cutting device capable of discharging lubricant to the cutting element in response to normal operating pressure, which is of relatively uncomplicated design, consists of a minimal number of parts, and is highly convenient, neat and effective to use.

It is a more specific object of the invention to provide a manual glass cutter having the foregoing features and advantages, wherein the supply of lubricant to the cutting element is reliable, and any dripping or leakage is minimized or avoided.

It is also an object of the invention to provide such a device which is relatively facile and inexpensive to manufacture.

SUMMARY OF THE INVENTION

It has now been found that the foregoing and related objects of the invention are readily attained in a self-lubricating cutting device including a body, having an internal chamber and a connecting channel portion extending inwardly from one of its ends, and a valve seat member dividing the chamber into an inner, air cavity section and an outer, reservoir section. The valve seat member has at least one aperture which provides communication between the chamber sections, and has an inner portion providing a valve seat surface extending about the aperture and contiguous to the inner chamber section. A tubular valve stem is mounted for axial movement through the seat member aperture, and has an inner end portion lying within the inner chamber section; the stem extends at least substantially through the outer chamber section, and the outer end portion thereof is disposed adjacent the channel portion of the body. Affixed to the inner end portion of the stem, and disposed thereon for sealingly engaging the valve seat surface of the seat member, is a sealing member, and means is provided for biasing the valve stem to a normal position with the sealing member seated upon the valve seat surface. The device also includes a head member having a first end portion slidably engaged within the channel portion of the body, to mount the head member thereon for reciprocation between inward and outward positions, and to substantially seal the chamber thereof. A second end portion of the head member extends outwardly of the body and is adapted to mount a cutting element in operative position. The head member has a passageway comprised of first and second sections. The first section extends from an inner surface of the first end portion of the head member toward the second end portion thereof, and has the outer end portion of the valve stem seated therein; the second section of the passageway provides communication between the first section, the cutting element, and the ambient. The passageway and the valve stem outer end portion are cooperatively dimensioned and configured to permit flow of liquid lubricant from the reservoir to the passageway second section between the valve stem and the head member, and the second section of the passageway is adapted for the containment of a porous wick element, which is interposed between the outer end of the valve stem and the cutting element and is in air flow communication with the ambient. As a result, when the sealing member is in its normal position with the head member in its outward position, the reservoir will be substantially sealed to the atmosphere and lubricant flow therefrom will be substantially prevented. Displacement of the head portion to its inward position will shift the valve stem to displace the sealing member from the seat surface, and to thereby permit the entry of air from the air cavity of the internal chamber to the reservoir thereof, through the seat member. This will in turn equalize pressure and permit lubricant flow through the passageway to the wick and cutting elements, with air flow from the ambient to the air cavity occurring through the wick element and the bore of the tubular valve stem.

Generally, the body, the internal cavity, and the head member will each be of elongated configuration, and the tubular valve stem is substantially rectilinear. The concepts of the invention are particularly applicable for the provision of a device adapted for manual operation, wherein the body is configured for hand-held use and the biasing means is responsive to forces normally involved in manual cutting, to permit inward displacement of the head member. Most specifically, the device may be a glass cutter, wherein the outer end portion of the head member is inwardly longitudinally slotted to receive a cutting wheel rotatably disposed on an axial element extending transversely across the slot. The slot may provide the "second" section of the head member passageway, and generally the wick of the cutter will be disposed therewithin.

Most desirably, the head member will be disengageably mounted upon the body and removable therefrom, to permit filling of the internal reservoir through the channel portion of the body, and generally both the outer end portion of the valve stem and the first section of the passageway in the head member will be rectilinear. A sealing element will usually be mounted on the head member "first" end portion and sealingly engaged upon the inner surface of the body defining the channel thereof; advantageously, the first end portion of the head member and the channel of the body will be both of circular cross-section, and the sealing member will be an O-ring mounted upon the head member. With such a construction, the head member may be rotatable within the body, and cooperating means will desirably be provided thereon to limit the degree of relative rotation therebetween. More particularly, the body may have a rectilinear groove and an arcuate recess extending, at circumferentially spaced locations, from the "one" end thereof and along the channel portion, and the head member may have a pin projecting radially therefrom for engagement in either the slot or the recess. Engagement of the pin in the slot will constrain the head member against rotation relative to the body, and engagement thereof in the recess will permit free rotation through a limited arc.

The valve stem may have a collar fixedly mounted upon its inner end portion and disposed within the inner section of the body chamber, and the sealing member may comprise an O-ring mounted upon the stem between the collar and the valve seat member, the latter being an annular element for cooperation therewith and having a conical recess leading into the aperture therethrough to provide the seat surface. Normally, the biasing means used will comprise a coil spring disposed upon the inner end portion of the valve stem between the collar and the surface of the body at the innermost end of its chamber, and the body may have laterally extending wing-shaped elements projecting from it, to afford anti-roll properties to the device.

BRIEF DESCRIPTION OF THE DRAWINGS

FIG. 3 is a fragmentary view of the cutter of the foregoing Figures, predominantly in cross-section, drawn to a greatly enlarged scale and showing the head member in fully extended position and the fluid reservoir section sealed against the entry of air;

FIG. 4 is a view similar to that of FIG. 3, showing the cutter in operation with the head member depressed inwardly and with the valve to the reservoir in an open position;

FIG. 6 is an end view of the cutter, drawn to the scale of FIGS. 3 and 4 and showing the cutting head in a first angular orientation relative to the body; and FIG. 7 is a view similar to that of FIG. 6, showing the cutting head and body in a second relative orientation.

DETAILED DESCRIPTION OF THE ILLUSTRATED EMBODIMENT

Figure 2:
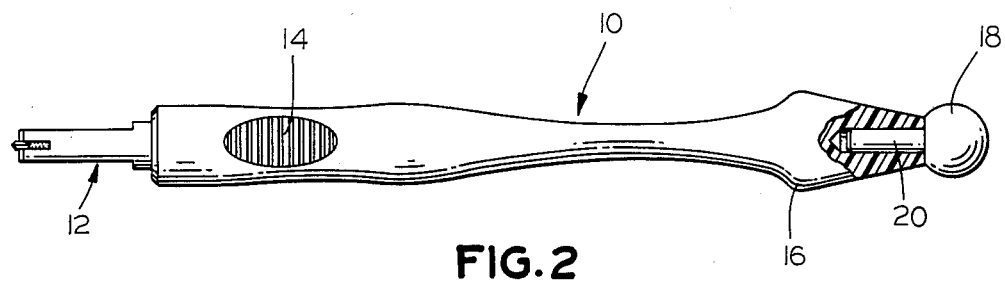
FIG. 2 is a plan view of the cutter, with a portion broken away to show the attachment of the tapping ball to the handle.
Figure 1:
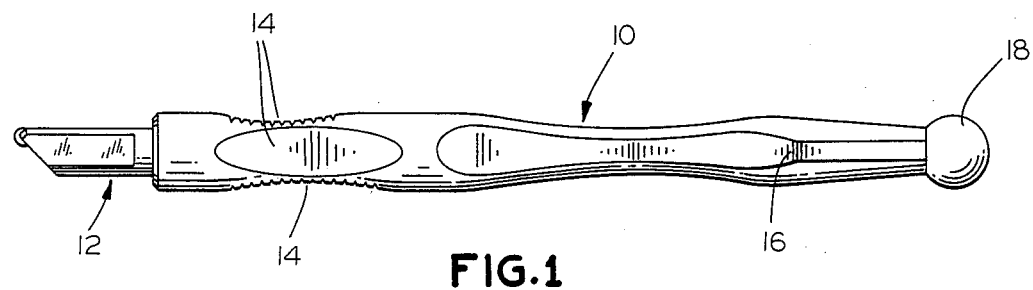
FIG. 1 is an elevational view of a hand-held glass cutter embodying the present invention.
Figure 5:
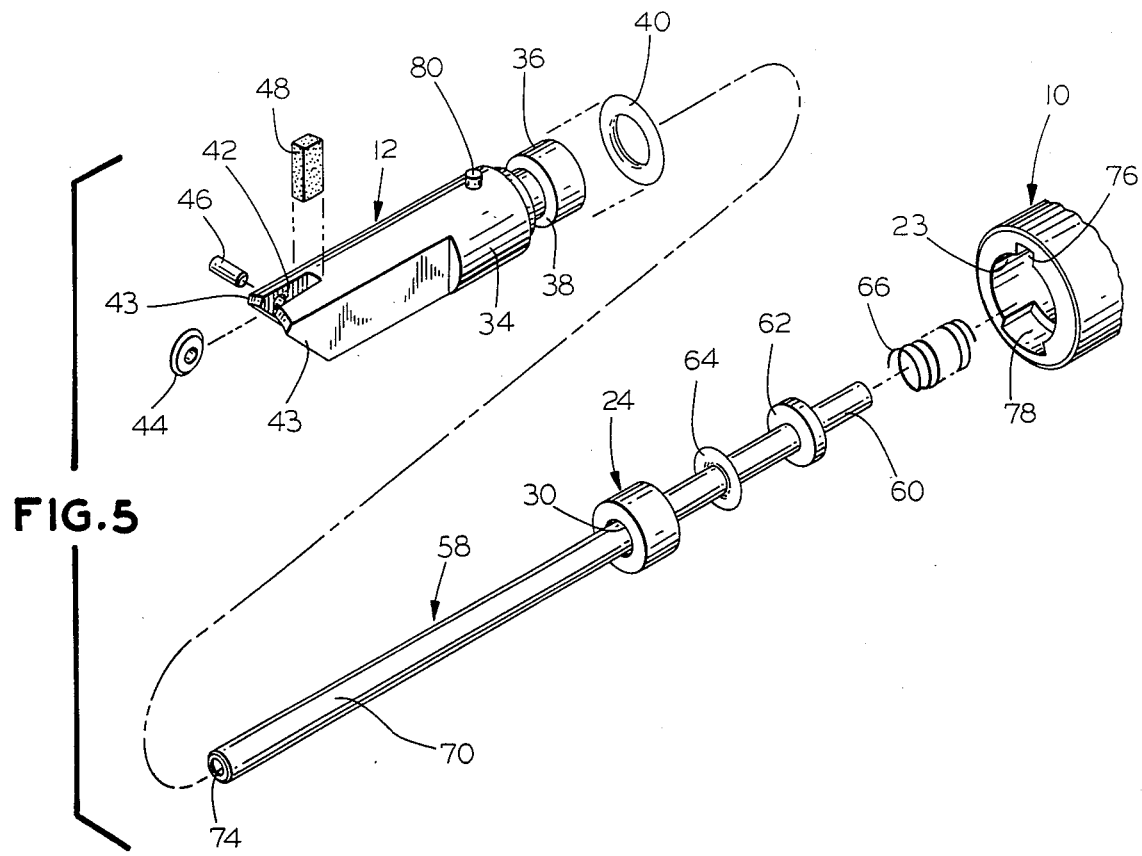
FIG. 5 is an exploded fragmentary perspective view showing features of the head member, the valve operating mechanism, and the forward end portion of the body.

Turning now in detail to the drawings, therein illustrated is a glass cutter embodying the present invention and comprised of a body or handle, generally designated by the numeral 10, and a head member, generally designated by the numeral 12. The handle 10 has corrugated surface portions 14 to provide a secure and comfortable grip; it also has a metal sphere 18 affixed at its rearward end by a short post 20, and a pair of transversely extending wing elements 16 adjacent thereto. Because the exterior configuration of the remainder of the body 10 is generally circular, the wing elements 16 serve to prevent rolling of the cutter when placed upon a flat surface; the sphere 18 is used to tap the glass to break it along the score line, as is conventional.

As is best seen in FIGS. 3 and 4, the handle 10 is hollow and has an internal chamber which is divided by a valve seat member, generally designated by the numeral 24, into an inner air cavity section 26 and an outer lubricant reservoir section 28. The valve seat member 24 is of generally annular configuration, and provides a central passageway 30 with a generally conical entrance portion 32 contiguous to the space 26; as will be more fully discussed hereinbelow, the portion 32 serves as a valve seat.

The head member 12 has a generally cylindrical inner portion comprised of two elements 34, 36, of different outside diameters, corresponding to the inside diameters of the sections 22, 23, which are of circular cross section and constitute a channel leading to the reservoir section 28 from the forward end of the body 10. A circumferential groove 38 is formed between the two elements 34, 36, and seats therein an O-ring 40, by which sealing engagement is effected between the head member 12 and the inside surface defining the larger diameter channel section 23 of the body 10. This of course serves to seal the internal chamber against the leakage of lubricating fluid, while at the same time permitting facile removal for filling of the reservoir section 28.

The outer end portion of the head member 12 is bifurcated, by an inwardly extending axial slot 42, to provide elements 43 between which the cutting wheel 44 is mounted upon a transversely extending axle 46. A small pad 48 of capillary or wicking material is seated within the slot 42 above the wheel 44 in position to wipe the lubricating fluid thereupon; as so seated, it is also in air flow communication with the ambient.

A bore extends longitudinally through the head member 12 into communication with the slot 42. The outer, or most forward, section 50 is of the smallest diameter; the progressively larger sections 52 and 54, and the beveled upper edge 56, provide a lead-in to the section 50 and facilitate manufacture.

A rectilinear tubular valve stem, generally designated by the numeral 58, extends through the channel 22, 23, the chambers 26, 28, and the valve seat member 24 of the handle 10. The inner end portion 60 of the stem 58 is disposed within the air cavity section 26, and has a collar 62 rigidly affixed thereupon. An O-ring 64 is frictionally engaged upon the stem 58 beneath the collar 62, and in position to sealingly seat upon the seating surface 32 of the member 24. Also disposed about the end section 60 is a coil spring 66, which has one end bearing upon the upper surface of the collar 62 and the opposite end in contact with the internal body surface 68. Thus, the spring 66 urges the stem 58 outwardly, to normally maintain the O-ring 64 in seated position against the conical surface 32.

The opposite end 70 of the stem 58 is engaged within the forward section 50 of the head member bore. It is important to note that the diameter of the section 50 is slightly larger (e.g., about 0.005 inch) than the outside diameter of the stem 58, to define a very narrow cylindrical space therebetween through which liquid lubricant can flow from the reservoir 28 to the wick pad 48. Despite the absence of a frictional fit between the head member 12 and the stem 58, it should be appreciated that the depth of insertion of the stem is limited by the structure of the outer end portion of the head member. Thus, the bore section 50 extends only to the slot 48, which is considerably narrower than the bore diameter, so that the elements 43 of the bifurcated portion provide laterally extending, upwardly facing surfaces (not visible) upon which the end of the stem 58 will bottom and seat.

When (as shown in FIG. 4) the cutter is in use, contact of the wheel 44 upon the glass workpiece 72 under normal manual pressure will force the head member 12 rearwardly into the handle 10, in turn shifting the stem 58 axially and lifting the O-ring 64 away from the seating surface 32. This will permit air from the cavity 26 to enter the reservoir section 28, thereby allowing the oil (not shown) to flow through the passageway sections 54, 52, 50, along the exterior of the stem 58, and into the wick pad 48 for distribution to the wheel 44. At the completion of the cutting operation, relief of the pressure on the tool will of course permit the stem 58 to return to its normal position under the force of the coil spring 66, causing the O-ring 64 to seal the top of the chamber 28 and thereby terminate flow of lubricant. Because the wick 48 is directly exposed to the ambient within the slot 42, air may freely enter the cavity 26, by passing through the pad 48 and bore 74 of the stem 58, to thereby maintain atmospheric pressure conditions therewithin.

The lower or outer end of the body 10 is provided with a rectilinear slot 76 and arcuate recess 78, both extending inwardly along the outermost channel portion 23; for cooperation therewith, a short pin 80 is affixed within an aperture 82 of the head member 12 and projects radially therefrom. In FIG. 6 the pin 80 is shown aligned within the linear slot 76, thereby constraining the head member 12 against rotation relative to the handle 10. In the 180°-displaced orientation of FIG. 7, receipt of the pin 80 within the arcuate recess 76 permits the head member 12 to swivel through a small arc (e.g., of about 45°) as indicated by the full and phantom line representations of the pin. The castering effect thereby produced is sometimes considered desirable from the standpoint of facilitating tracking of the cutting wheel 44 along an irregular edge contour.

As illustrated in the drawing, the handle 10 will normally be molded from a plastic material and the head member 12 will be made of metal. However, the construction of the parts of the device will be dictated largely by economic, manufacturing and aesthetic preferences, and the variety of choices will in any event be readily apparent to those skilled in the art. Perhaps it should be specifically mentioned, however, that fabricating the head member from a relatively inexpensive synthetic resinous material (such as a tough and rigid polyester), rather than from metal, may be particularly desirable from the standpoint of economical replacement when the cutting element becomes excessively worn. The latter will of course generally be of carbon steel or a comparable material, and the wick will normally be a pad of felt or the like, although integral elements may be feasible as well.

It will also be appreciated that the exterior configuration of the handle may take any of numerous forms, to suit specific preferences. The interior construction may vary similarly, as long as the features necessary to permit reciprocal movement of the head member, the valving action, and the flow of lubricant and air, in the manner described, are provided. A particularly significant feature of the invention resides in the fact that the construction provided employs only a single opening through which oil can flow to the exterior (i.e., the channel through the head member), which opening will discharge the lubricant only where it is desired (i.e., onto the wick). This of course avoids the need for any other passageway into the reservoir chamber, from which the oil can drip or leak. Although the device has been illustrated in the form of a manual glass cutter, it will be understood that the concepts of the invention are equally applicable to other types of manual cutting tools, as well as to units designed for installation into power cutting machines.

As indicated above, the relationship between the passageway of the cutting head and the valve stem is of particular importance, and must provide an effective channel for the flow of lubricating fluid from the reservoir to the wick. This may be achieved by utilizing a bore through the head which is of slightly greater diameter than the stem, as shown in the drawings. Alternatively, other configurations, such as longitudinal grooves in the stem and/or the inside surface of the the head member, may be utilized for oil flow. The construction illustrated is particularly preferred, however, since it readily enables removal of the head member 12 from the body 10 and facile insertion of the stem 58 into the bore. Although this capability is, of course, highly desirable from the standpoint of permitting convenient fillage of the reservoir and easy replacement of the cutting head, such removability is not essential to the invention, and other means for permitting the addition of fluid to the reservoir may be substituted if so desired.

Thus, it can be seen that the present invention provides a novel, self-lubricating cutting device which is of relatively uncomplicated design, is made with a minimal number of parts, and is highly convenient, reliable, and effective to use. The invention more specifically provides a manual glass cutter having the foregoing features and advantages which is relatively facile and inexpensive to manufacture, and which is constructed in such a way that leakage of the lubricating liquid from its reservoir is substantially avoided.

Having thus described the invention, what is claimed is:

1. A self-lubricating cutting device comprising:
   (a) a body having an internal chamber and a channel portion extending inwardly from one end of said body into said chamber;
   (b) a valve seat member disposed within said body and defining, in an inner section of said chamber, an air cavity and, in an outer section thereof communicating with said channel, a reservoir for a supply of liquid lubricant, said valve seat member having at least one aperture therethrough providing communication between said chamber sections, and having an inner portion providing a valve seat surface extending about said aperture and contiguous to said inner chamber section;
   (c) a tubular valve stem mounted for axial movement through said seat member aperture and having an inner end portion lying within said inner chamber section, said valve stem extending at least substantially through said outer chamber section and having an outer end portion lying adjacent said channel portion of said body;
   (d) a sealing member affixed to said inner end portion of said stem and disposed thereon for sealingly engaging said valve seat surface of said seat member;
   (e) means for biasing said valve stem to a normal position with said sealing member seated upon said valve seat surface; and
   (f) a head member having a first end portion slidably engaged within said channel portion of said body to mount said head member thereon for reciprocation between inward and outward positions and for substantially sealing said chamber thereof, and having a second end portion extending outwardly of said body and adapted to mount a cutting element in operative position thereon, said head member having a passageway with a first section extending from an inner surface of said first end portion toward said second end portion thereof and having said outer end portion of said valve stem seated therein, a second section of said passageway providing communication between said first section thereof, the cutting element, and the ambient, said passageway and valve stem outer end portion being dimensioned and configured to permit flow of liquid lubricant from said reservoir to said passageway second section between said valve stem and head member, said second section of said passageway being adapted for the containment therein of a porous wick element interposed between the outer end of said valve stem and the cutting element and in air flow communication with the ambient; whereby, when said sealing member is in said normal position and said head member is in said outward position thereof, said reservoir is substantially sealed to the atmosphere and lubricant flow therefrom is substantially prevented, and whereby displacement of said head portion to said inward position thereof will shift said valve stem inwardly to displace said sealing member from said seat surface, thereby permitting the entry of air from said air cavity of said internal chamber to said reservoir thereof through said seat member, in turn equalizing pressure and permitting lubricant flow through said passageway to the wick element and cutting element, air flow from the ambient to said air cavity occurring through the wick element and the bore of said tubular valve stem.

2. The device of claim 1 wherein said body, said internal cavity thereof, and said head member are each of elongated configuration, and wherein said tubular valve stem is substantially rectilinear.

3. The device of claim 1 adapted for manual operation, said body being configured for hand-held use, and said biasing means being responsive to forces normally involved in manual cutting to permit inward displacement of said head member.

4. The device of claim 1 wherein said second end portion of said head member is inwardly longitudinally slotted to receive a cutting wheel therewithin, and wherein said device additionally includes a glass cutting wheel rotatably disposed on an axial element extending transversely across said slot, said slot providing said second section of said head member passageway.

5. The device of claim 1 additionally including a wick member disposed within said second section of said passageway of said head member.

6. The device of claim 1 wherein said head member is disengageably mounted upon said body, and is removable therefrom to permit filling of said reservoir through said channel portion of said body.

7. The device of claim 6 wherein both said outer end portion of said valve stem and said first section of said passageway in said head member are rectilinear.

8. The device of claim 6 additionally including a sealing element mounted on said head member first end portion and sealingly engaged upon the inner surface of said body defining said channel thereof.

9. The device of claim 8 wherein said first end portion of said head member and said channel of said body are both of circular cross-section, and wherein said sealing member is an O-ring mounted upon said head member.

10. The device of claim 6 wherein both said first end portion of said head member and said channel of said body are of circular cross-section, and wherein said head member is rotatable within said body, said body and head member having cooperating means thereon to limit the degree of relative rotation therebetween.

11. The device of claim 10 wherein said body has a rectilinear groove and an arcuate recess extending, at circumferentially spaced locations, inwardly from said one end thereof and along said channel portion, and wherein said head member has a pin projecting radially therefrom for alternative engagement in either said slot or said recess, engagement of said pin in said slot constraining said head member against rotation relative to said body, and engagement thereof in said recess permitting limited rotation of said head member through the arcuate length thereof.

12. The device of claim 1 wherein said valve stem has a collar fixedly mounted upon said inner end portion thereof within said inner section of said body chamber, wherein said sealing member comprises an O-ring frictionally engaged upon said stem between said collar and said valve seat member, and wherein said valve seat member is an annular element.

13. The device of claim 12 wherein said biasing means comprises a coil spring disposed upon said inner end portion of said valve stem between said collar and the surface of said body defining the innermost end of said first chamber section.

14. The device of claim 12 wherein said inner portion of said valve seat member comprises a conical recess leading into said aperture, and wherein said aperture provides substantially the only communication through said seat member between said inner and outer sections of said body chamber.

15. The device of claim 1 wherein said body is devoid of openings, other than said channel, between said internal chamber thereof and the exterior, the passage of air to said internal chamber occurring only through said wick element and said valve stem.

16. A cutting device comprising: a body having a channel portion of circular cross-section extending inwardly from one end thereof; and a head member having a first end portion of corresponding circular cross-section slidably engaged within said channel portion of said body for disengageable and rotatable mounting of said head member therewithin, and having a second end portion extending outwardly of said body and adapted to mount a cutting element in operative position thereon; said body having a rectilinear groove and a separate arcuate recess both said groove and said recess extending, at circumferentially spaced locations, inwardly from said one end of said body and along said channel portion and disconnected from one another, and said head member having a pin projecting radially from said first end portion thereof for alternative engagement in either said groove or said recess, engagement of said pin in said groove constraining said head member against rotation relative to said body, and engagement thereof in said recess permitting swiveling of said head member back and forth through the arcuate length thereof.

17. The device of claim 16 additionally including an O-ring mounted upon said first end portion of said head member and frictionally engaging said head member within said channel portion of said body.

* * * * *